331-98

SEARCH ROOM

July 2, 1968 J. B. QUIRK 3,391,350

TUNABLE SLOT COUPLING BETWEEN OSCILLATOR AND WAVEGUIDE

Filed Aug. 9, 1967

INVENTOR,
JOHN B. QUIRK.

BY: Milton W. Lee, AGENT
Harry M. Saragovitz,
Edward J. Kelly &
Herbert Berl
ATTORNEYS.

United States Patent Office 3,391,350
Patented July 2, 1968

3,391,350
TUNABLE SLOT COUPLING BETWEEN OSCILLATOR AND WAVEGUIDE

John B. Quirk, Owensboro, Ky., assignor, by mesne assignments, to the United States of America as represented by the Secretary of the Army Filed Aug. 9, 1967, Ser. No. 659,543
2 Claims. (Cl. 331—98)

ABSTRACT OF THE DISCLOSURE

A slot-coupled oscillator for a superhigh frequency microwave system, wherein the oscillator is enclosed in a cylindrical housing which is attached to a short section of waveguide in such a manner that the coupling slot within the housing wall is exposed to the guide. A tuning plunger is located within the housing and adjusted axially to cover a portion of the longitudinally positioned slot to thereby vary the effective length of the slot and consequently the operating frequency of the apparatus.

*Background of the invention*

The present invention relates generally to oscillators for generating high frequency signals, and more particularly, to a slot coupled oscillator for superhigh frequency microwave systems which are tunable to operate at any frequency within a predetermined relatively wide frequency range.

A considerable amount of effort has heretofore been expended in attempts to develop a superhigh frequency oscillator for a microwave system which could be coupled to a waveguide with low coupling losses and without the RF field discontinuities generally associated with conventionally coupled coaxial reentrant oscillators.

*Summary of the invention*

It is the general purpose of this invention to provide a slot-coupled oscillator for transferring energy from an oscillator to a waveguide which permits the efficiency of transfer to be maintained at its optimum value over a wide range of frequencies by simple mechanical tuning.

To attain this, the oscillator housing is affixed to a short section of waveguide in such a manner that the coupling slot within the housing wall is exposed to the guide. A tuning plunger is located within the oscillator housing and upon axial adjustment thereof a portion of the slot is covered to thereby vary the effective length of the slot and the operating frequency of the apparatus.

*Brief description of the drawing*

The exact nature of this invention will be readily apparent from consideration of the following specification relating to the annexed drawings in which.

*Description of the preferred embodiment*

Figure 3:
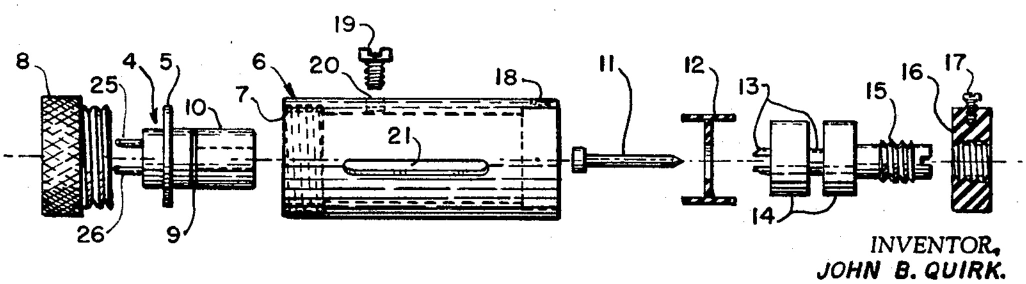
FIGURE 3 is an exploded perspective view, partially in cross-section, showing certain components of the oscillator of FIGURE 1.

The oscillator shown in the drawings is adapted for operation in the 8 to 12 gc. range and uses a triode tube of the XD–85 series type, generally indicated as 4 in FIGURE 3.

Tube 4 is provided with a cathode ring 5 firmly abutting the internal flange of oscillator housing 6 at the bottom of screw well 7 and is held in place by a cathode retainer 8 when threadedly engaged with screw well 7. Ring 9 is a grid ring with cylindrical grid sleeve 10 integrally attached thereto. The anode is not shown but is generally indicated by the dashed lines within the grid sleeve 10 in tube 4 of FIGURE 3. An anode line 11 is connected to the anode of tube 4 within the grid sleeve 10 and extends through a Teflon dielectric member 12 to make electrical contact with conducting member 13 which is integrally associated with shorting plunger 14. The conducting member 13 and plunger 14 is threadedly engaged at 15 with anode end insulator 16. Tap 17 is the B+ anode connection for tube 4 and extends through the oscillator housing 6 at opening 18 upon assembly of the various oscillator components.

Probe 19 extends through oscillator housing 6 at opening 20 and contacts grid sleeve 10 for producing a nonuniform field with the oscillator so that a field gradient can be produced across slot 21 in the oscillator housing 6.

Figure 2A:
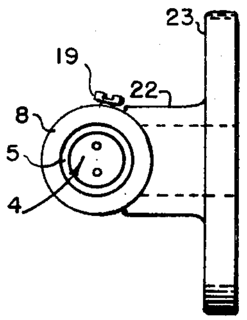
FIGURES 2(*a*) and 2(*b*) are end and bottom perspective views respectfully, of the oscillator of FIGURE 1.
Figure 2B:
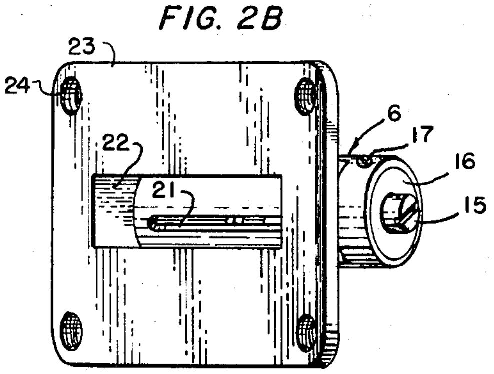

Slot 21 functions as a coupling mechanism to transfer energy from the oscillator to waveguide stub 22. Stub 22 is a portion of a waveguide transmission system and is provided with a flange plate 23 containing mounting openings 24 for inserting screws, or the like, to effect a secure mounting to the waveguide system. The oscillator housing is affixed to the short section of waveguide 22 in such a manner that slot 21 is exposed to the guide cavity. One particular placement of the slot within the guide results in the optimum for coupling and is generally slightly askewed of the center portion of stub 22 as shown in FIGURE 2(*b*). The placement of the slot is most easily accomplished by trial and error.

Figure 1:
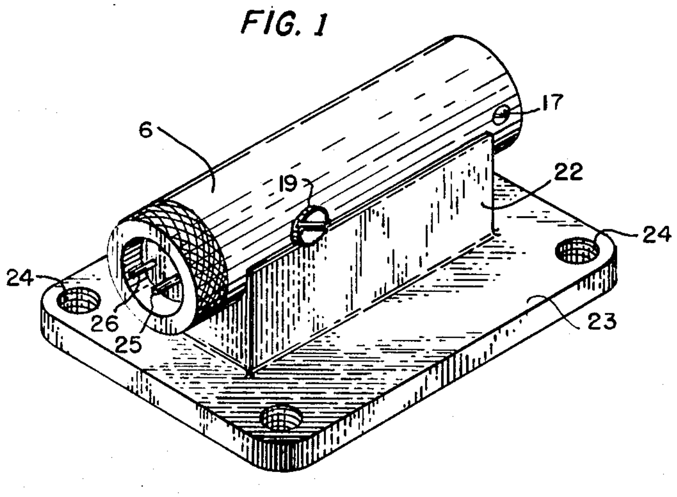
FIGURE 1 is a perspective view of a cavity type oscillator embodying the invention.

The leads 25 and 26 shown in FIGURES 1 and 2(*a*) are connections for the cathode heater of tube 4 and extend from the cathode of tube 4 through the cathode retainer for connection to a supply source.

Since the length of the coupling slot 21 in housing 6 of the oscillator determines the frequency at which it best operates, it follows that if the slot length is varied and tracked with tuning plunger 14, the coupling can be tracked across a band of frequencies. For an optimum range of operation, the slot 21 is positioned longitudinally with respect to oscillator housing 6, such that at the lowest frequency of operation the shorting plunger 14 begins to cover the end of the slot nearest the end of the housing containing the adjustment plunger. As the plunger 14 approaches the end of grid sleeve 10, the effective length of slot 21 is shortened due to plunger 14 covering the end portion thereof. In this manner, tracking of the slot-coupling is realized and permits the efficiency of transfer to be maintained at its optimum value over a wide range of frequencies by simple mechanical tuning.

It should be understood, of course, that the foregoing disclosure relates to only a preferred embodiment of the invention and that numerous modifications or alterations may be made therein without departing from the spirit and scope of the invention as set forth in the appended claims.

I claim:

1. A variable frequency slot-coupled oscillator comprising:
   - a cylindrical housing member having the longitudinal wall member thereof attached to a waveguide stub forming an integral part of a microwave transmission system, said housing adapted to utilize an electron tube in one end thereof, said tube having at least a cathode, a control grid, and an anode;
   - an axially adjustable plunger having a readily accessible end portion extending externally from the end of said housing opposite the tube-mounted end for effecting movement of said plunger in a longitudinal direction with respect to the cylindrical housing, whereby the effective length of a coupling slot within said oscillator housing exposed to said waveguide stub may be varied by adjusting said plunger to cover a portion of said coupling slot, thereby varying the operating frequency of the apparatus.

2. A variable frequency slot-coupled oscillator comprising:

a waveguide stub adapted to be connected into a microwave transmission system;

a cylindrical oscillator housing having a slot positioned along the longitudinal axis, said housing affixed to said waveguide stub in such a manner that the slot within the housing is exposed to the waveguide cavity;

a vacuum tube positioned within one end of said housing and held in place by a retaining plug fixedly attached to said one end of said housing, said vacuum tube having at least a cathode, a grid, and an anode;

cathode connections extending through said retaining plug to a source of heater current;

an anode line extending longitudinally through said housing to a tap on an insulating plug attached to the opposite end of said housing from said retainer plug;

a grid sleeve integrally connected to the grid of said tube with a probe extending through the oscillator housing and contacting said grid sleeve for producing a nonuniform field with the oscillator so that a field gradient exists across the slot in the oscillator housing;

a tuning plunger positioned within the housing and having an external portion extending through the insulating plug for accessibility of adjustment, said plunger positioned such that axial adjustment varies that portion of the slot covered by the plunger and thus varies the effective length of the slot with a subsequent change in the operating frequency of the apparatus.

References Cited

UNITED STATES PATENTS

| | | | |
|---|---|---|---|
| 2,540,148 | 2/1951 | Tawney | 333—83 X |
| 2,682,610 | 6/1954 | King | 333—95 |

ROY LAKE, *Primary Examiner.*

S. H. GRIMM, *Assistant Examiner.*